United States Patent [19]
Fogelberg

[11] 3,828,877
[45] Aug. 13, 1974

[54] DIFFERENTIAL FOR FOUR-WHEEL DRIVE

[75] Inventor: Mark J. Fogelberg, Muncie, Ind.

[73] Assignee: Borg-Warner Corporation, Chicago, Ill.

[22] Filed: July 18, 1973

[21] Appl. No.: 380,443

[52] U.S. Cl.................... 180/44 R, 180/49, 74/711
[51] Int. Cl............................................. B60k 17/30
[58] Field of Search........... 180/44 R, 44 M, 49, 22, 180/23, 24.09; 74/710.5, 711

[56] References Cited
UNITED STATES PATENTS

| | | | |
|---|---|---|---|
| 3,073,405 | 1/1963 | Hill et al. | 180/44 R |
| 3,107,763 | 10/1963 | Hill | 180/44 R |
| 3,375,735 | 4/1968 | Saari | 74/711 |
| 3,390,593 | 7/1968 | Brownyer | 180/44 R |
| 3,407,893 | 10/1968 | Hill et al. | 180/44 R |
| 3,656,573 | 4/1972 | Hallberg | 180/44 R |
| 3,748,928 | 7/1973 | Shiber | 74/711 |

Primary Examiner—Allen N. Knowles
Attorney, Agent, or Firm—Donald W. Banner

[57] ABSTRACT

A planetary differential mechanism suitable for use in a multiple path drive system including planet gears, a pair of gear elements, and a locking gear which meshes with a planet gear. The differential is arranged such that during normal operation one of the gear elements normally overspeeds the other and the locking gear is held out of engagement with either of said gear elements permitting differentiation between them, but when the normally overspeeding gear element overspeeds the normally overspeeding gear element, the locking gear is caused to mesh with one of the gear elements and prevents differentiation between the gear elements.

15 Claims, 7 Drawing Figures

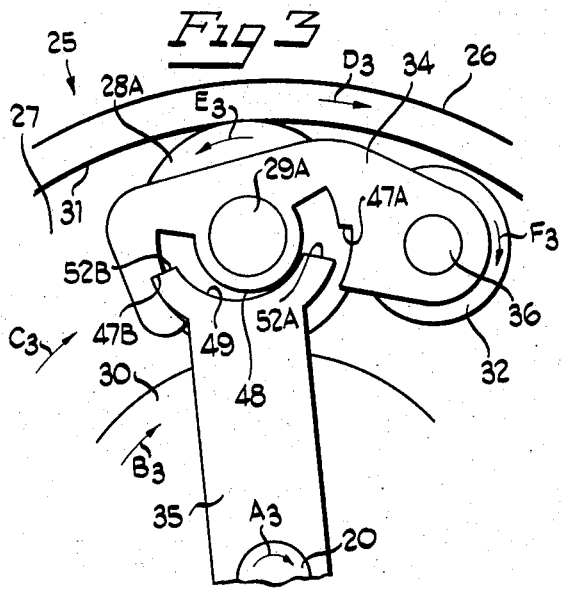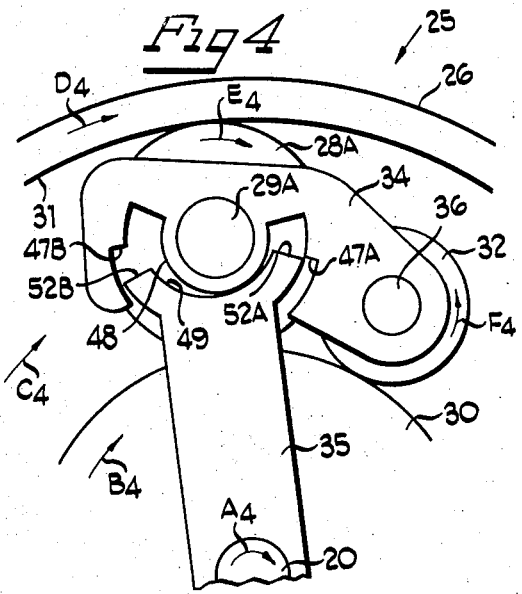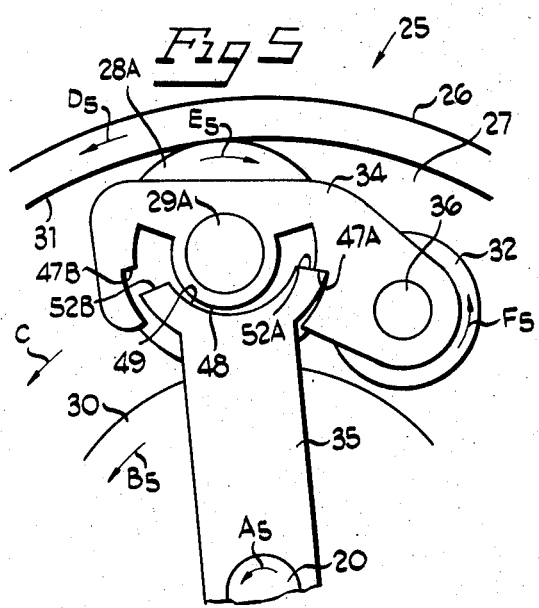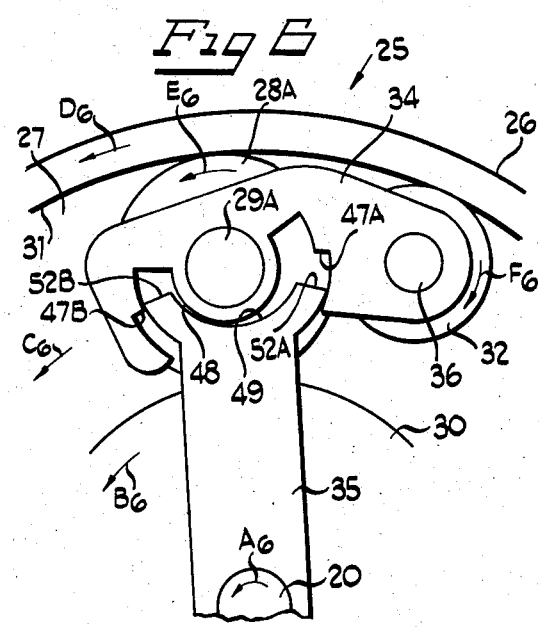

DIFFERENTIAL FOR FOUR-WHEEL DRIVE

BACKGROUND OF THE INVENTION

This invention relates to planetary differential mechanisms, and, more particularly, to a planetary differential incorporating a lockup feature, actuable, when one predetermined gear element overspeeds the other, to prevent differentiation between the gear elements. The particular planetary differential disclosed is adapted for use in a torque transfer mechanism which can be used as a center differential in a four wheel drive system. The differential receives an input torque from a prime mover and distributes the same to a plurality of drive axles.

It is well recognized in the art that the tractive efforts of a vehicle are substantially improved if driving torque is applied to more than one axle. This concept underlies the employment of known four wheel drive systems in military vehicles or vehicles intended for operation over unimproved terrain. However, certain problems arise in the provision of known four wheel drive systems which have thus far precluded their employment in pneumatic tired commercial and passenger vehicles.

If all four wheels are positively driven by the engine, a severe amount of tire scrape or cornering scrub occurs as the vehicle negotiates curves or turns. Under such conditions, the front wheels must run through an arc of greater radius than the rear wheels. Further, in such a system, slight differences in effective wheel radii, caused by inevitable differences in tire inflation, tread wear, or the like, result in the occurrence of what is known as circumferential scrub. Under such conditions, the wheels having small radii necessarily tend to rotate faster than those having larger radii while traversing the same distance. If front and rear axles are positively locked together, one set of tires will be scraped over the ground. Tires will not long withstand such abuse. In addition, undue stress and windup occurs in the drive train and fuel consumption is excessive.

One approach to solving the problems inherent in such a system has been to provide a manually operable clutch or disengageable gear, enabling the front wheels of the vehicle to be selectively engaged or disengaged for positive drive effort. Thus, the front wheels would only be locked into engagement for four wheel drive when surface conditions would permit. Such engagement would normally occur when the vehicle was traveling on unpaved surfaces.

Much effort has been devoted to providing a third or center differential in a four wheel drive system for splitting torque received from an engine such that front and rear drive shafts would serve respectively to drive front and rear axles through appropriate differentials. Such a differential permits over-speeding of any one or more of the drive axles for the previously mentioned circumstances. If the center differential is uninhibited and if one set of wheels should lose traction with the road surface as on ice or the like, these wheels will spin freely and the differential will cause the other set of wheels to exert no driving torque.

Manually operable locking means have been incorporated into such differentials which, when engaged, eliminate differential action between the drive shafts and positively lock the driven parts together. These are, however, inherently so limited in effectiveness that they have never found any commercial acceptance.

Other four wheel drive systems have been proposed which incorporate a center differential which will automatically provide for inhibiting differential action whenever limited free ranges of differential action are exceeded. Such devices are operative to automatically restore such action when the tendency to exceed the range ceases. One such device is shown and described in U.S. Pat. No. 2,796,941 issued to Claude Hill. As will be apparent, however, such a system results in a mechanism which is both costly and cumbersome.

Another approach has been to utilize, as a center or third differential, a limited slip differential of the bevel gear, coneclutch type, pre-loaded to an engaged condition, having an input driven by the vehicle engine and a pair of output shafts each of which is adapted to be connected to a drive axle. Such a device is shown and described in application, Ser. No. 867,995 filed Oct. 21, 1969.

SUMMARY OF THE INVENTION

The present invention provides a differential mechanism of the planetary gear type, adapted for use as a center or third differential in a multiple path drive system. The differential receives an input torque from a prime mover and divides the torque between a pair of output shafts each of which are connected to one drive axle. The planetary differential includes a planetary carrier, at least one planet gear and a ring gear and a sun gear which are referred to as gear elements. The differential also includes a locking gear meshing with a planet gear and adapted to mesh with either the sun gear or the ring gear. The differential is oriented such that one of the gear elements normally overspeeds the other. A locking gear carrier and direction sensing means cooperate to hold the locking gear out of engagement with either of the gear elements for either direction of rotation of the input means as long as the normally overspeeding gear element overspeeds the normally underspeeding gear element thereby allowing differentiation between the gear elements. The locking gear carrier and direction sensing means are actuable, when the normally underspeeding gear element overspeeds the normally overspeeding gear element to cause the locking gear to mesh with either the sun gear or the ring gear depending on the direction of rotation of the input means and to cause a lockup of the differential and prevent differentiation between the sun and ring gear.

BRIEF DESCRIPTION OF THE DRAWINGS

FIG. 3 is a top view in schematic of a portion of the differential mechanism showing the normal forward mode of operation.

FIG. 4 is a top view in schematic of a portion of the differential mechanism showing the forward lockup mode of operation.

FIG. 5 is a top view in schematic of a portion of the differential mechanism showing the normal reverse mode of operation.

FIG. 6 is a top view in schematic of a portion of the differential mechanism showing the reverse lockup mode of operation.

FIG. 7 is a side view in section of a torque transfer mechanism including the differential of the present invention.

DESCRIPTION OF THE PREFERRED EMBODIMENT

Figure 1:
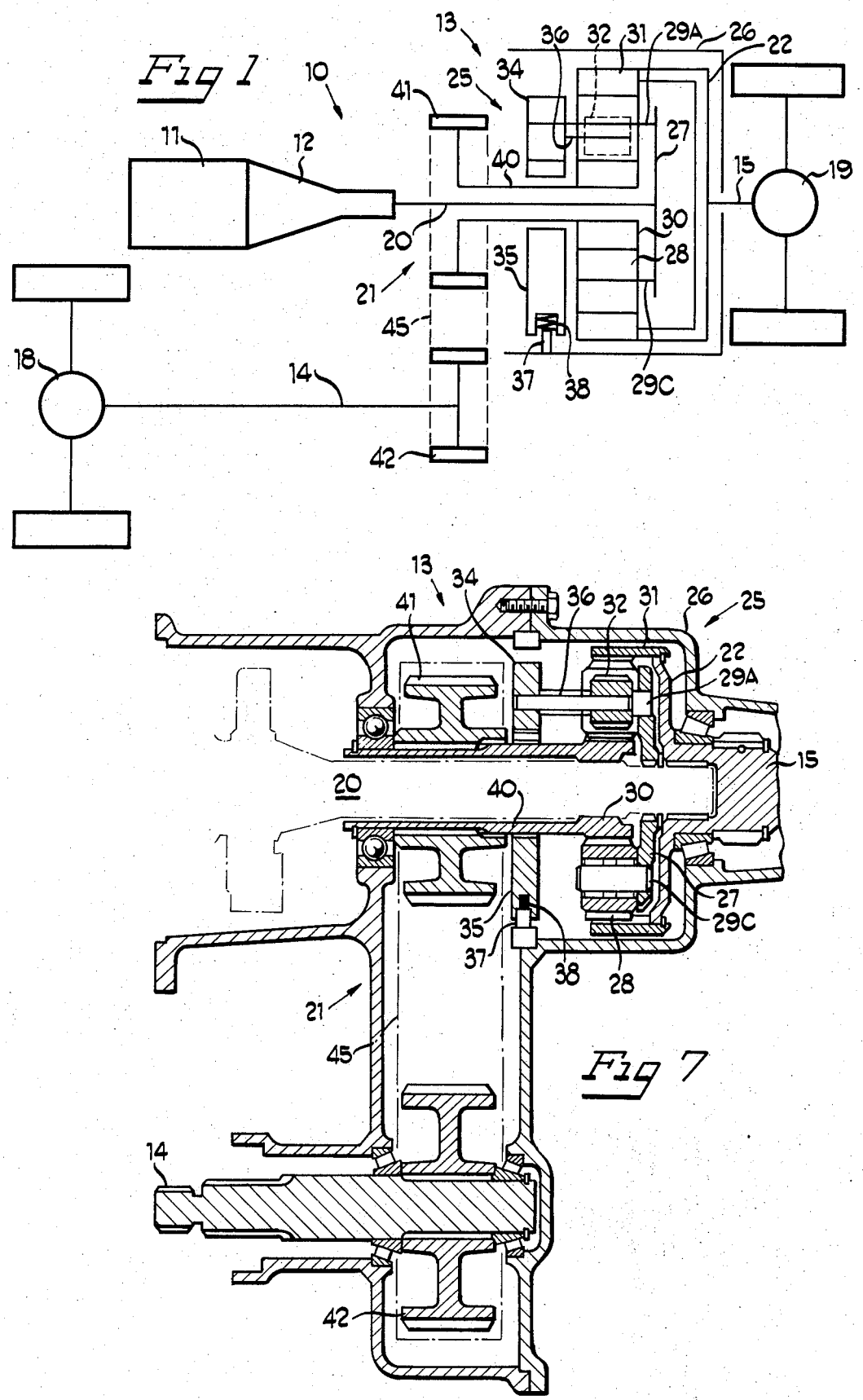
FIG. 1 is a schematic of a four wheel drive system including a torque transfer mechanism which incorporates a planetary differential of the present invention.

As best illustrated in FIG. 1 a four wheel drive system 10 is shown for driving a motor vehicle. The system 10 includes a prime mover 11, generally an internal combustion engine, a transmission 12 driven by the engine 11, a torque transfer mechanism 13 driven by the transmission 12, a pair of drive shafts 14 and 15 driven by the torque transfer mechanism 13 and a pair of drive axles 18 and 19 driven respectively by the drive shafts 14 and 15. The drive axle 18 represents the front drive of the vehicle and the axle 19 represents the rear drive. The drive axles 18 and 19 may each incorporate a differential mechanism which may be either of the uninhibited type or of the limited slip type.

The torque transfer mechanism 13 includes an input shaft 20 driven by the transmission 12, a pair of outputs 21 and 22 and a differential mechanism 25 drivingly connected between the input 20 and the outputs 21 and 22. The outputs 21 and 22 are respectively connected to drive shafts 14 and 15.

Figure 2:
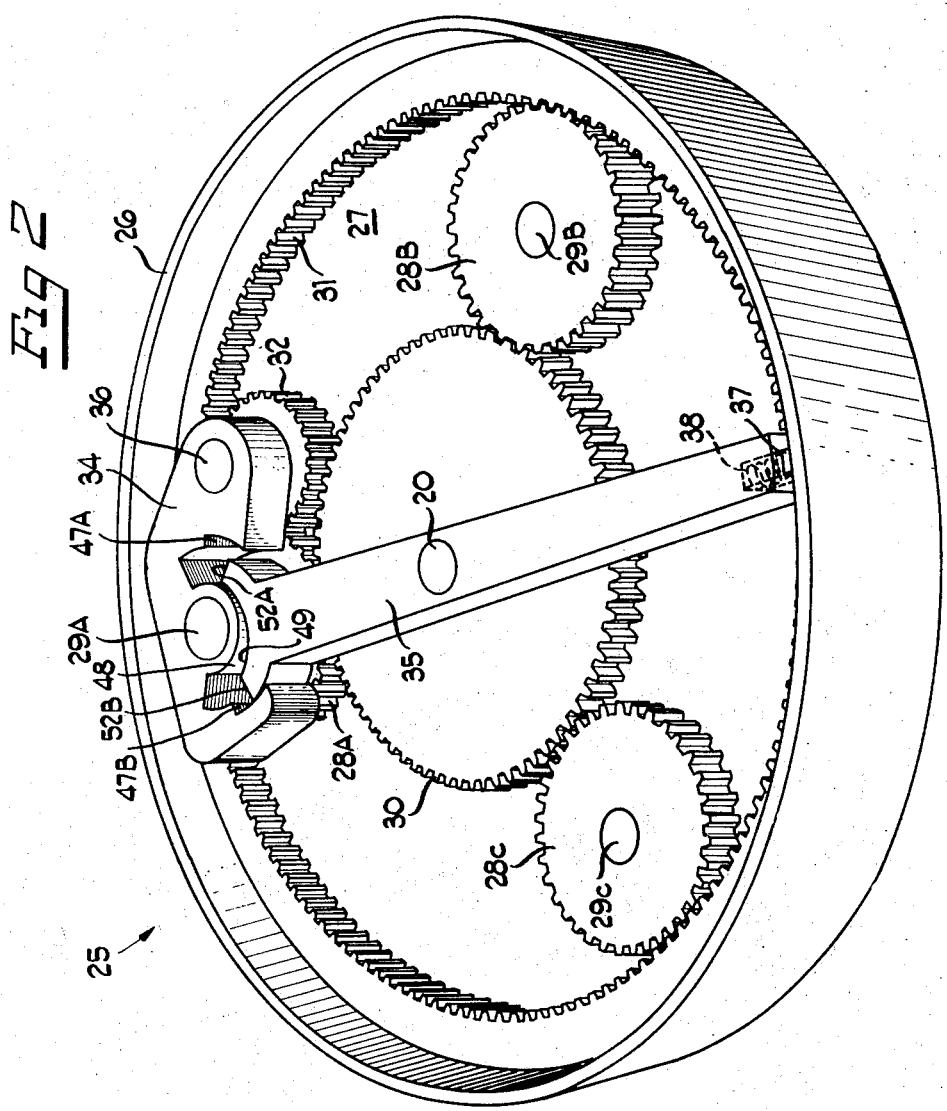
FIG. 2 is a perspective view of one embodiment of the differential of the present invention.

The preferred embodiment of the differential mechanism 25, as best illustrated in FIGS. 1 and 2, includes a housing 26, a planet carrier element 27, driven by the input shaft 20, at least one but preferably a plurality of planet gears 28A, 28B and 28C carried by the planet carrier 27, a pair of gear elements 30 and 31, respectively designated as a sun gear and a ring gear and meshed with the planet gears 28, a locking gear 32 meshed with the planet gear 28A and adapted to mesh with either the sun gear 30 and the ring gear 31, a locking gear carrier 34 in which the locking gear 32 is carried and journalled for rotation and a direction responsive means 35 adapted to coact with the locking gear carrier 34 as will be explained. The planet gears 28 are mounted on pins 29 which are carried by the planet carrier 27.

The direction responsive means 35 is shown in FIG. 2 as a link journalled for rotation about and relative to the input shaft 20. The locking gear carrier 34 carries the locking gear 32, which is mounted for rotation thereon by means of pin 36, and holds the locking gear 32 into meshing engagement with the planet gear 28. The link 35, at its outer extremity, carries a friction member 37 adapted to frictionally engage the housing 26. The friction member 37 is shown biased into engagement with the housing 26 by a spring 38.

The locking gear carrier 34 is journalled for rotation about the pin 29A as best shown in FIG. 2. A friction connection is established between the planet gear 28A and the locking gear carrier 34 such that the carrier 34 will be urged to rotate about the pin 29A in the same direction of rotation as the planet gear 28A. The friction connection can be accomplished in any of a number of well known ways, one method being to merely force the carrier 34 into contact with the gear 28A.

The locking gear carrier 34 includes a set of shoulders or stops 47A and 47B, defined by the carrier 34. The carrier 34 also defines a partially circular journal surface 48 which extends the width of the carrier.

The direction responsive link 35 defines at one end thereof an arcuate journal surface 49. The surface 49 terminates at its outer extremities in finger surfaces 52A and 52B which are adapted to coact with the shoulders 47A and 47B.

The sun gear 30 is affixed to a shaft 40 at one end of the shaft. A gear 41 is affixed to the shaft 40 at its other end. The output 21 includes a gear 42. A chain or belt 45 connect the gears 41 and 42 for rotary drive. The output 22 is shown connected to the ring gear 31.

The differential mechanism illustrated in FIGS. 1 and 2 represents one preferred embodiment. It should be realized that any of a number of changes could be made which would not depart from the scope of the invention nor significantly affect the operation of the differential. The input shaft 20 is shown driving the planet carrier 27 but the differential could be rearranged so as to have the input shaft 20 driving either the sun gear 30 or the ring gear 31, with corresponding changes being made in the arrangement of the other differential elements.

OPERATION

The operation of the elements of the differential mechanism of the present invention are best illustrated in FIGS. 3, 4, 5 and 6.

FIG. 3 illustrates the differential mechanism 25 in its normal forward mode of operation in an unlocked condition. Means, not shown, are associated with the differential 25 to provide for normal overspeed of the sun gear 30 with respect to the ring gear 31. This could be accomplished in any of a number of ways. One arrangement for achieving this result would be to have the individual differential mechanisms of the drive axles 18 and 19 be of different numerical ratio such that for a given revolution of all four wheels the drive shaft 14 would travel through a greater arc than the drive shaft 15. The differential ratios may be adjusted to allow for any desired range of predetermined over-speed of one gear element with respect to the other.

For purposes of example, it will be assumed that the ratios are adjusted such that the sun gear 30 overspeeds the ring gear 31 by approximately 5 percent during the normal forward mode of operation.

The input shaft 20 is connected to the planet carrier 27 and both rotate in the same direction at the same angular speed of velocity. Arrows have been placed on the various rotational elements of the differential mechanism to indicate both the direction of rotation of each element and the relative rotational speed of that element with respect to the other elements of the differential. Longer arrows indicate relatively greater speed than shorter arrows.

Thus, as viewed in FIG. 3, since the input shaft 20 and the planet carrier 27 are connected to each other and rotate at the same angular velocity, arrow A, is equal in length to arrow C3. The planet gears 28 mesh with both the ring gear 31 and the sun gear 30. As the planet carrier 27 rotates clockwise, as shown in FIG. 3, the sun gear 30 rotates clockwise faster than the carrier 27 and the ring gear 31 rotates clockwise slower than the carrier 27. The sun gear 30 thus overspeeds the ring gear 31 by the previously predetermined percentage and the planet gears 28 rotate counterclockwise.

The locking gear 32 is held in meshing engagement with the planet gear 28A by the locking gear carrier 34. In the illustrated embodiment, the locking gear 32 is smaller in diameter than the planet gear 28. The locking gear 32 rotates about its own axis, pin 36 in a clockwise direction. The link 35 is frictionally engaged with the housing 26 and this tends to retard any rotation of the link 35 about the central axis of the input shaft 20.

The link 35 thus assumes a position with respect to the carrier 34 such that the carrier 34 is being urged to the right while link 35 is held relatively stationary.

Locking gear carrier 34, by virtue of its friction connection with planet gear 28A, is urged to rotate in a counterclockwise direction about pin 29 and does so until shoulder 47B of the carrier abuts finger surface 52B of the link 35. At this point, the carrier 34 is prevented from further counterclockwise rotation. Thus, the locking gear 32 is held out of engagement with either the sun gear 30 or the ring gear 31 and the differential mechanism 25 operates to allow differentiation between the sun gear and the ring gear. Differentiation is correspondingly allowed between the output 21 and the output 22 as long as the sun gear continues to overspeed the ring gear.

FIG. 4 illustrates the differential mechanism 25 of the present invention immediately prior to its forward locked condition. The direction and speed of rotation are the same as in FIG. 3 for input shaft 20, sun gear 30 and planet carrier 27, as indicated by arrows A4, B4 and C4. The direction of rotation of the ring gear 31 remains the same but the speed has increased until it slightly exceeds the rotational speed of the sun gear 30, thus causing the planet gear 28 to reverse its direction of rotation and begin to rotate clockwise as shown by the arrow E4.

Locking gear 32 also reverses its direction of rotation and now rotates counterclockwise as indicated by the arrow F4.

Since the planet gear 28 is now rotating clockwise and is frictionally connected to the locking gear carrier 34, the carrier is now urged to rotate in a clockwise direction about pin 29A until locking gear 32 engages the sun gear 30, the finger surface 52A clearing the shoulder surface 47A. Thus, the three gears 28A, 32 and 30 cannot rotate in mesh, the result being a lockup of the differential, thereby preventing any further differentiation between sun gear 30 and ring gear 31. The planet carrier 27 continues to rotate at the same speed as prior to lockup but the sun and ring gear now also rotate at the same speed as do outputs 21 and 22.

A vehicle condition which would simulate the differential condition shown in FIG. 4 would be as follows. Assume, looking at FIG. 1, that the individual differentials of front and rear axles 18 and 19 were arranged in a ratio relationship such that for normal forward operation the drive shaft 14 would normally overspeed the drive shaft 15. Because of the previously described connections the sun gear 30 would thus normally overspeed the ring gear 31 as shown in FIG. 3 and normal differentiation between the gear elements is permitted. If, for some reason, the rear wheels lose traction, the torque received by the input shaft 20 will result in acceleration of the output 22 and, consequently, the ring gear 31 to which it is attached. Such a condition could occur if the rear wheels encountered ice or mud or snow or any of a variety of other substances which would cause a loss of traction. For minor relative speed variations between the front and rear driving axles no effect will be seen on the differential since the built in relative over-speed is of the magnitude of 5 percent. Once, however, the rear drive axle exceeds the speed of the front drive axle by more than this predetermined percentage the ring gear 31 will overspeed the sun gear 30 causing a reversal in the direction of rotation of the planet gear 28, as illustrated in FIG. 4 and consequent lockup of the differential due to engagement of the planet gear 28, the locking gear 32 and the sun gear 30.

FIG. 5 illustrates the differential mechanism 25 of the present invention in its normal or unlocked condition when the vehicle is driven in reverse. In general, the operation is substantially the same as the operation described in FIG. 3.

The input shaft 20, planet carrier 27, sun gear 30, ring gear 31, planet gear 28 and locking gear 32 are rotating at the same angular speed as in FIG. 3 but in the opposite direction as indicated by arrows A5, B5, C5, D5, E5 and F5. Since the input shaft 20 and planet carrier 27 are now rotating counterclockwise the link 35 will reverse its position with respect to the carrier 34 from the position shown in FIGS. 3 and 4.

The locking gear carrier will be urged to rotate about the pin 29A in a clockwise direction until shoulder 47A contacts finger surface 52A. At this point, the carrier 34 is prevented from further clockwise rotation thus holding locking gear 32 out of engagement with either the sun gear 30 or the ring gear 31. Free differentiation between sun gear 30 and ring gear 31 will be permitted.

FIG. 6 illustrates the differential mechanism 25 of the present invention immediately prior to its lockup condition when the vehicle is being driven in a reverse direction. In general, the operation of the differential mechanism is substantially the same as the operation described for the structure disclosed in FIG. 4.

The input shaft 20, planet carrier 27, sun gear 30, ring gear 31, planet gear 28 and locking gear 32 are rotating at the same angular speed as in FIG. 4 but in the opposite direction as indicated by arrows A6, B6, C6, D6, E6 and F6. When the ring gear 31 overspeeds the sun gear 30 the direction of rotation of the planet gear 28 will reverse from the clockwise direction shown in FIG. 5 to the counterclockwise direction as shown in FIG. 6.

Locking gear 32 also reverses its direction and now rotates counterclockwise as indicated by the arrow F6. The locking gear carrier 34 is also urged to rotate in a counterclockwise direction about pin 29A. The relative positions of journal surfaces 48 and 49 are the same in FIG. 6 as they were in FIG. 5. The carrier 34 will rotate counterclockwise until locking gear 32 engages the ring gear 31, the finger surfaces 52B clearing the shoulder 47B. The gears 28, 31 and 32 are urged into engagement and lock thereby preventing any further differentiation between sun gear 30 and ring gear 31. The planet carrier 27 continues to rotate at the same speed as prior to lockup but the sun gear and ring gear now also rotate at the same speed as do outputs 21 and 22.

For purposes of simplicity of explanation, the differential mechanism of the present invention has been illustrated as incorporating gears in a gear drive mechanism but it should be understood that any other type of rotary drive such as friction rollers could be substituted for the gear drive.

FIG. 7 illustrates a torque transmitting mechanism 13 including the planetary differential of the present invention. The housing 26 serves as the housing for the entire torque transmitting mechanism 13.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A planetary differential including a planet carrier element; at least one planet gear carried by said carrier element; first and second gear elements meshed with said planet gear; an input means drivingly connected to one of said elements; means associated with said differential to provide for normal overspeed of one of said gear elements with respect to said other gear element; a locking gear meshing with said planet gear and adapted to engage either of said gear elements, means associated with said locking gear whereby for normal overspeed of said one gear element with respect to said other gear element said locking gear is held out of engagement with either of said first or second gear elements and differentiation between said gear elements is permitted but actuable when said normally underspeeding gear element overspeeds said normally overspeeding gear element, to cause engagement of said locking gear with said first or second gear element to prevent differentiation between said gear elements.

2. A planetary differential as in claim 1 including a locking gear carrier pivoted about a central axis of said planet gear for retaining said locking gear in engagement with said planet gear, said locking gear being carried by and journalled for rotation within said locking gear carrier.

3. A planetary differential as in claim 2 including direction responsive means being frictionally engaged with a stationery element and adapted to coact with said locking gear carrier to hold said locking gear out of engagement with said gear elements.

4. A planetary differential as in claim 3 including a friction connection between said locking gear carrier and said planet gear whereby said locking gear carrier is urged to rotate about the central axis of said planet gear in the same direction of rotation as said planet gear.

5. A planetary differential as in claim 4 in which said direction responsive means is adapted to assume a first position relative to said locking gear carrier when said input means is rotated in a first direction and is adapted to assume a second position relative to said locking gear carrier when said input means is rotated in a reverse direction.

6. A planetary differential as in claim 5 in which said direction responsive means is engageable with said locking gear carrier during said normal overspeed condition to maintain said locking gear out of engagement with either of said gear elements.

7. A planetary differential as in claim 6 wherein said direction responsive means coact with said locking gear carrier to permit engagement of said locking gear with one of said gear elements when said normally underspeeding gear element overspeeds said normally overspeeding gear element.

8. A planetary differential as in claim 6 in which said locking gear carrier includes stop means engageable by said direction sensing means during said normal overspeed condition so as to prevent further rotation of said locking gear carrier to maintain said locking gear out of engagement with either of said gear elements.

9. A planetary differential as in claim 3 including a stationary housing surrounding said differential whereby said direction responsive means is frictionally engaged with said housing.

10. A planetary differential as in claim 1 in which a plurality of planet gears are carried by said planet carrier.

11. A multiple path drive system for a vehicle having at least two pairs of traction wheels including a pair of axle assemblies, a pair of torque transmitting members each connected to an axle assembly, a torque transfer mechanism comprising driven means adapted to receive an input torque, a planetary differential mechanism driven by said driven means incuding a planetary carrier element, at least one planet gear carried by said carrier element, first and second gear elements meshed with said planet gear, each of said gear elements connected to one of said torque transmitting members, means drivingly connecting said driven means to one of said elements, means associated with said multiple path drive system to provide for normal overspeed of one of said gear elements with respect to said other gear element, a locking gear meshing with said planet gear and adapted to engage either of said gear elements, means associated with said locking gear such that for normal overspeed of said one gear element with respect to said other gear element, said locking gear is held out of engagement with either of said first or second gear elements and differentation between the gear elements is permitted, but actuable when said normally underspeeding gear element overspeeds said normally overspeeding gear element to cause engagement of said locking gear with one of said first or second gear elements to prevent differentiation between said gear elements.

12. A multiple path drive system as in claim 11 in which said means for providing normal overspeed of said one gear element with respect to said other gear element includes a first differential mechanism having a ratio relationship and associated with one of said drive axle assemblies and a second differential mechanism having a ratio relationship and associated with said other drive axle assembly, said ratio relationships of said first and second differential mechanisms being unequal.

13. A torque transfer mechanism comprising a housing, an input shaft operable within said housing, a pair of output shafts operable within said housing, a planetary differential mechanism driven by said input shaft including a planet carrier element, at least one planet gear carried by said carrier element, first and second gear elements meshed with said planet gear, each of said gear elements connected to an output shaft, means associated with said torque transfer mechanism to provide for normal overspeed of one of said gear elements with respect to said other gear element, a locking gear meshing with said planet gear and adapted to engage either of said gear elements, means associated with said locking gear such that for normal overspeed of said one gear element with respect to said other gear element said locking gear is held out of engagement with either of said first or second gear elements and differentiation between said gear elements is permitted, but actuable when said normally underspeeding gear element overspeeds said normally overspeeding gear element, to cause engagement of said locking gear with one of said first or second gear elements to prevent differentiation between said gear elements.

14. A torque transfer mechanism as in claim 13 wherein one of said output shafts is concentric with said input shaft and said other of said output shafts is laterally offset with respect to said input shafts.

15. A planetary differential including a planet carrier element; a plurality of planet gears carried by said carrier element; a sun gear and a ring gear meshed with said planet gears; input means drivingly connected to said carrier element; means associated with said differential to provide for normal overspeed of said sun gear with respect to said ring gear; a locking gear meshing with one of said planet gears and adapted to engage either said sun gear or said ring gear; a locking gear carrier carrying said locking gear and retaining said locking gear in engagement with said planet gear, said locking gear carrier rotatable about a central axis of said planet gear and frictionally connected to said planet gear such that said locking gear carrier is urged to rotate about the central axis of said planet gear in the same direction as said planet gear; and direction sensing means associated with said locking gear carrier and frictionally engaged with a stationary element whereby said direction sensing means is adapted to engage said locking gear carrier and maintain said locking gear out of engagement with either of said gear elements for normal overspeed of said one gear element with respect to said other gear element thereby permitting differentiation between said gear elements, but actuable when said normally underspeeding gear element overspeeds said normally overspeeding gear element to allow engagement of said locking gear with one of said gear elements to prevent differentiation between said gear elements.

* * * * *